US011465532B2

(12) United States Patent
Marius

(10) Patent No.: US 11,465,532 B2
(45) Date of Patent: Oct. 11, 2022

(54) SYSTEMS AND METHODS FOR POWER DISTRIBUTION IN ELECTRIC AIRCRAFT

(71) Applicant: Archer Aviation, Inc., San Jose, CA (US)

(72) Inventor: Diederik Marius, Sunnyvale, CA (US)

(73) Assignee: Archer Aviation, Inc., San Jose, CA (US)

( * ) Notice: Subject to any disclaimer, the term of this patent is extended or adjusted under 35 U.S.C. 154(b) by 0 days.

(21) Appl. No.: 17/156,047

(22) Filed: Jan. 22, 2021

(65) Prior Publication Data

US 2022/0234470 A1　Jul. 28, 2022

(51) Int. Cl.
| | |
|---|---|
| *B60L 58/18* | (2019.01) |
| *B60L 50/60* | (2019.01) |
| *B60L 58/12* | (2019.01) |
| *B64C 27/52* | (2006.01) |
| *B64C 27/32* | (2006.01) |
| *B64C 27/24* | (2006.01) |
| *B64D 31/00* | (2006.01) |
| *H02J 4/00* | (2006.01) |
| *H02J 7/00* | (2006.01) |

(Continued)

(52) U.S. Cl.
CPC ............... *B60L 58/18* (2019.02); *B60L 50/60* (2019.02); *B60L 58/12* (2019.02); *B64C 27/32* (2013.01); *B64C 27/52* (2013.01); *B64D 27/24* (2013.01); *B64D 31/00* (2013.01); *H02J 4/00* (2013.01); *H02J 7/0013* (2013.01); *H02J 7/0048* (2020.01); *H02J 7/342* (2020.01); *B60L 2200/10* (2013.01); *B64D 2221/00* (2013.01)

(58) Field of Classification Search
None
See application file for complete search history.

(56) References Cited

U.S. PATENT DOCUMENTS

| 5,612,579 A | 3/1997 | Wisbey et al. |
|---|---|---|
| 6,344,700 B1 | 2/2002 | Eisenhauer et al. |
| 8,129,951 B2 | 3/2012 | Turner et al. |

(Continued)

FOREIGN PATENT DOCUMENTS

| EP | 3303124 A1 | 12/2016 |
|---|---|---|
| EP | 3624301 A1 | 3/2020 |

(Continued)

OTHER PUBLICATIONS

Bower et al., U.S. Appl. No. 16/878,380, filed May 19, 2020 for "Vertical Take-Off and Landing Aircraft."

(Continued)

*Primary Examiner* — Jared Fureman
*Assistant Examiner* — Aqeel H Bukhari
(74) *Attorney, Agent, or Firm* — Morrison & Foerster LLP

(57) ABSTRACT

A power distribution system for an electric aircraft includes a first electric propulsion unit comprising at least two power stages; a first battery pack electrically connected to a first power stage of the at least two power stages; a second battery pack electrically connected to a second power stage of the at least two power stages; and a control system configured to control the first battery pack, the second battery pack, the first power stage, and the second power stage to transfer power from the first battery pack to the second battery pack through the first power stage and the second power stage.

19 Claims, 7 Drawing Sheets

(51) Int. Cl.
*H02J 7/34* (2006.01)
*B64D 27/24* (2006.01)

(56) References Cited

U.S. PATENT DOCUMENTS

| | | |
|---|---|---|
| 8,174,238 B2 | 5/2012 | Badger |
| 8,487,558 B2 | 7/2013 | Ogawa et al. |
| 8,552,686 B2 | 10/2013 | Jung et al. |
| 9,493,090 B2 | 11/2016 | Timmons et al. |
| 9,601,812 B2 | 3/2017 | Namou et al. |
| 9,616,766 B2 | 4/2017 | Fujii |
| 9,713,961 B2 | 7/2017 | Fan et al. |
| 9,783,037 B2 | 10/2017 | Muto et al. |
| 10,128,674 B2 | 11/2018 | Nelson |
| 10,179,519 B2 | 1/2019 | Schmidt |
| 2014/0330463 A1 | 11/2014 | Jeong |
| 2018/0134400 A1 | 5/2018 | Knapp et al. |
| 2018/0215465 A1 | 8/2018 | Renteria |
| 2018/0290746 A1 | 10/2018 | Hanna et al. |
| 2019/0092257 A1 | 3/2019 | Boecker et al. |
| 2019/0229541 A1 | 7/2019 | Ono |
| 2019/0255967 A1 | 8/2019 | Doersam et al. |
| 2019/0288521 A1* | 9/2019 | Wilhide ............ H02J 7/0014 |
| 2020/0164995 A1 | 5/2020 | Lovering et al. |
| 2021/0206499 A1* | 7/2021 | Balachandran ........ B64D 35/02 |
| 2022/0009625 A1 | 1/2022 | Bower et al. |

FOREIGN PATENT DOCUMENTS

| | | |
|---|---|---|
| GB | 2569659 A | 6/2019 |
| JP | 2010-183671 A1 | 8/2010 |
| WO | 2012/133706 A1 | 10/2012 |
| WO | 2015/138217 A1 | 9/2015 |
| WO | 2016/189797 A1 | 12/2016 |
| WO | 2019/006469 A1 | 1/2019 |
| WO | 2019/041383 A1 | 3/2019 |
| WO | 2019/145777 A1 | 8/2019 |

OTHER PUBLICATIONS

Bower et al., U.S. Appl. No. 16/923,939, filed Jul. 8, 2020 for "Systems and Methods for Power Distribution in Electric Aircraft."

International Search Report and Written Opinion dated Oct. 25, 2021, directed to International Application No. PCT/US2021/040619; 12 pages.

Melack, U.S. Appl. No. 17/115,119, filed Dec. 8, 2020 for "Systems and Methods for Power Distribution in Electric Aircraft."

International Search Report and Written Opinion dated Apr. 13, 2022, directed to International Application No. PCT/US2022/070282; 12 pages.

International Search Report and Written Opinion dated Apr. 8, 2022, directed to International Application No. PCT/US2021/072776; 10 pages.

* cited by examiner

SYSTEMS AND METHODS FOR POWER DISTRIBUTION IN ELECTRIC AIRCRAFT

FIELD OF THE DISCLOSURE

This disclosure generally relates to electric aircraft, and more specifically to electric power distribution for electric aircraft.

BACKGROUND OF THE DISCLOSURE

Progress in battery technology has enabled battery packs that have power densities suitable for powering electric motors of lightweight, electric aircraft. Just like the battery packs themselves, electric power distribution systems for controlling power transfer between battery packs of electric aircraft must be light and efficient. However, weight considerations for electric power distribution systems can sometimes be at odds with goals of minimizing failure concerns. For example, conventional electric power distribution systems often employ multiple battery packs electrically connected in parallel to achieve a suitable power output but such electrical connection between battery packs requires the power distribution system to also include additional hardware between different battery packs to prevent uncontrolled power flow between the battery packs. Such additional hardware adds weight to electric aircraft and adds additional points of failure to the power distribution system of electric aircraft. Thus, balancing aircraft weight and failure concerns poses a challenge for designing electric aircraft.

SUMMARY OF THE DISCLOSURE

According to some embodiments, a power distribution system of an electric aircraft is configured to transfer power from one battery pack to another battery pack through an electric propulsion unit of the aircraft. The electric propulsion unit includes a multi-stage motor in which each battery pack is connected to a different stage for independently powering the respective stage. Power from one battery pack can be transferred to another battery pack via electromagnetic coupling between the power stages and the rotor of the electric propulsion unit. In this way, power can be transferred from one battery pack to another battery pack through the electric propulsion unit without requiring additional hardware. Extra torque provided by one stage can be used to drive another stage as a generator, with the generated electricity being fed to a battery pack connected to the electric propulsion unit. The battery packs can be electrically isolated from one another, which can ensure that a failure of one battery pack and its power distribution system does not cause failure of another battery pack. Since power is transferred between battery packs through the electric propulsion units, the battery packs can have different voltage levels and topologies (such as energy cells/power cells). The ability to transfer energy from one battery pack to another can balance power loads across the battery packs to achieve a safe and energy efficient range of electric aircraft operation during flight.

According to some embodiments, a power distribution system for an electric aircraft includes a first electric propulsion unit comprising at least two power stages; a first battery pack electrically connected to a first power stage of the at least two power stages; a second battery pack electrically connected to a second power stage of the at least two power stages; and a control system configured to control the first battery pack, the second battery pack, the first power stage, and the second power stage to transfer power from the first battery pack to the second battery pack through the first power stage and the second power stage.

In any of these embodiments, the control system may be configured to determine a required power output of the first electric propulsion unit and a charge differential between the first battery pack and the second battery pack and control the battery packs and power stages to transfer charge from the first battery pack to the second battery pack based on the required power output and charge differential.

In any of these embodiments, the first battery pack and the second battery pack may be electrically isolated.

In any of these embodiments, the control system may be configured to control the first power stage and the second power stage to create additional torque on a rotor via the first power stage and the additional torque is used to generate electricity in the second power stage.

In any of these embodiments, the control system may include a first motor controller for controlling the first power stage, a second motor controller for controlling the second power stage, and a main controller configured to control the first motor controller and the second motor controller to transfer the power from the first battery pack to the second battery pack through the first power stage and the second power stage.

In any of these embodiments, the first power stage may include a first set of windings of the first electric propulsion unit and the second power stage may include a second set of windings of the first electric propulsion unit.

In any of these embodiments, the first electric propulsion unit may include a propeller that can provide thrust as power is transferred from the first battery pack to the second battery pack through the first power stage and second power stage.

In any of these embodiments, the first electric propulsion unit may be a tiltable proprotor.

In any of these embodiments, the first electric propulsion unit may be a fixed rotor.

In any of these embodiments, the first and second battery packs may be configured to be at least 100 volts.

In any of these embodiments, electric power of the first electric propulsion unit may be at least 10 kilowatts.

In any of these embodiments, the first electric propulsion unit may include a third power stage electrically connected to a third battery pack, wherein the control system is configured to control the third battery pack to transfer power from the first battery pack to the third battery pack through the first power stage and the third power stage.

In any of these embodiments, including a second electric propulsion unit that includes a single stage electrically connected to the first battery pack.

According to some embodiments, a method for powering an electric aircraft includes: detecting a first charge status of a first battery pack connected to a first power stage of at least two power stages of a first motor and a second charge status of a second battery pack connected to a second power stage of the at least two power stages of the first motor; determining whether there is a charge differential between the first battery pack and the second battery pack based on the first charge status and the second charge status; and in accordance with a determination that there is a charge differential, controlling the first power stage and the second power stage to transfer energy from the first battery pack to the second battery pack through the first and second power stages to charge the second battery pack.

In any of these embodiments, the first charge status may include at least one of a battery charge of the first battery pack and a discharge rate for the first battery pack, and the second charge status may include at least one of a battery charge of the second battery pack and a discharge rate for the second battery pack.

In any of these embodiments, a first electric propulsion unit may include the first motor and the first motor drives a propeller for achieving a desired thrust from the first electric propulsion unit.

In any of these embodiments, the method may include determining a power output required from the first stage to achieve the desired thrust from the first electric propulsion unit, determining an available power margin based on the power output, and transferring energy from the first battery pack to the second battery pack based on the available power margin.

In any of these embodiments, controlling the first power stage and the second power stage to transfer energy may include controlling the first power stage to generate torque on a rotor of the motor in excess of an amount of torque required to achieve the desired thrust and controlling the second power stage of the first electric propulsion unit to generate electricity from excess torque for charging the second battery pack.

In any of these embodiments, the second battery pack may power a power stage of a second motor.

According to some embodiments, an electric aircraft includes: a first electric propulsion unit comprising at least two power stages; a first battery pack electrically connected to a first power stage of the at least two power stages; and a second battery pack electrically connected to a second power stage of the at least two power stages; and a control system configured to control the first battery pack, the second battery pack, the first power stage, and the second power stage to transfer power from the first battery pack to the second battery pack through the first power stage and the second power stage.

BRIEF DESCRIPTION OF THE DRAWINGS

The disclosure will now be described, by way of example only, with reference to the accompanying drawings, in which.

DETAILED DESCRIPTION OF DISCLOSURE

Figure 1A:
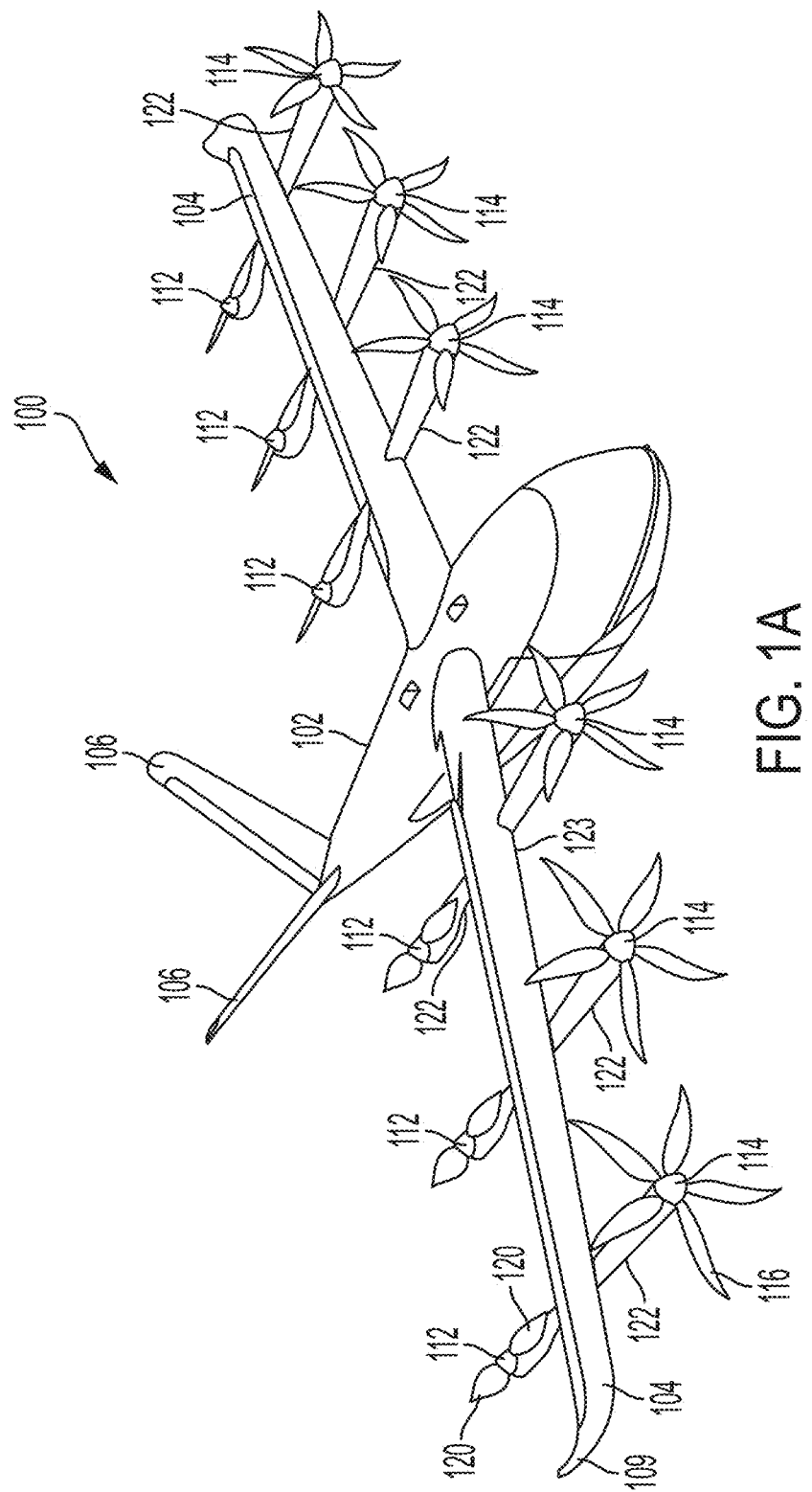
FIG. 1A shows a VTOL aircraft in a forward flight configuration, according to various embodiments.

According to some embodiments, systems and methods for power distribution in an electric aircraft include distributing power between battery packs through electric propulsion units that include multiple power stages. A first battery pack can be electrically connected to a first power stage of an electric propulsion unit, a second battery pack can be electrically connected to a second power stage of the electric propulsion unit, and power can be transferred between the two battery packs via electromagnetic coupling between the two power stages and rotor of the electric propulsion unit. Excess torque applied to the rotor of the electric propulsion unit by the first power stage via energy from the first battery pack can be used to drive the second power stage to generate electricity that charges the second battery pack. Thus, energy can be shuttled from one battery pack to another without requiring the battery packs to be electrically connected to one another. With the additional energy received from the first battery pack, the second battery pack will be able to provide greater power during a high demand period or the same power for a longer duration given that the second battery pack stores more energy.

According to some embodiments, enabling the power distribution system to transfer power from a first battery pack to a second battery pack through an electric propulsion unit results in decreased weight for the electric aircraft and fewer points of failure compared to electric aircrafts that include power distribution systems that employ battery packs electrically connected in parallel. For example, power transfer from the first battery pack to the second battery pack through power stages of the electric propulsion unit avoids the requirement of additional hardware associated with direct power transfer from the first battery pack to the second battery pack, such as converters between different battery packs. Such additional hardware unfavorably increases weight of the electric aircraft and adds additional points of failure relative to embodiments of the systems and methods described herein.

According to some embodiments, the power distribution system may be configured to control power transfer between the first battery pack and the second battery pack based on power needs during different flight operations (such as hover, forward flight, or forward climb). For example, hover requires a high power output from an electric propulsion unit compared to forward climb, and thus during hover, the power distribution system may provide power to the electric propulsion unit from one or both battery packs such that no power is transferred directly between battery packs.

According to some embodiments, the first power stage of the electric propulsion unit includes a first set of windings and a first motor controller configured for controlling power flow through the first set of windings. Likewise, the second power stage of the electric propulsion unit includes a second set of windings and a second motor controller configured for controlling power through the second set of windings. The first set of windings may be interwound with the second set of windings. The power stages and the rotor of the electric propulsion unit may be electromagnetically coupled for transferring power through the electric propulsion unit. For example, the first set of windings of the first stage may generate an electromagnetic field that drives the rotor and movement of the rotor through the electromagnetic field of the second stage causes current flow through the second stage.

According to some embodiments, the power distribution system may include a main controller configured to control each motor controller to deliver power where needed across the electric aircraft. For example, the main controller may control the first motor controller to direct power draw to or from the first battery pack through the first power stage and may control the second motor controller to direct power draw to or from the second battery pack through the second power stage. Due to electromagnetic coupling between the first power stage, the second power stage, and the rotor, the power draw which results in current flow through the power stages allow power to be transferred between the first battery pack and the second battery pack. According to some embodiments, the main controller may determine how to control power transfer from one battery pack to another battery pack through power stages of an electric propulsion unit based on power requirements of the electric propulsion unit and charge statuses of the battery packs connected to the electric propulsion unit. For example, the main controller may be configured to determine power required from the first power stage to achieve a desired thrust from the first electric propulsion unit, detect a first charge status of the first battery pack and a second charge status of the second battery pack, determine whether there is a charge differential between the first battery pack and the second battery pack based on the detected charge statuses, and in accordance with the determination that there is a charge differential, the main controller may be configured to control the first power stage and the second power stage to transfer energy from the first battery pack to the second battery pack through the first and second power stages to charge the second battery pack. For example, the main controller may control the first power stage to generate torque on a rotor of the motor in excess of an amount of torque required to achieve the desired thrust from the first electric propulsion unit and control the second power stage of the first electric propulsion unit to generate electricity from excess torque for charging the second battery pack. According to some embodiments, a charge status may include an amount of charge remaining in battery, a rate of discharge, or a combination thereof. As explained further below, discharge rates of a battery pack may depend on operation of the electric propulsion unit (such as hover, forward climb, forward flight) and environmental conditions (such as temperature, pressure, and wind).

According to some embodiments, the power distribution system may be configured to transfer power between different battery packs through a plurality of electric propulsion units. For example, a first battery pack may be electrically connected to a first electric propulsion unit and a second battery pack may be electrically connected to the first electric propulsion unit and a second electric propulsion unit. Specifically, the first battery pack may be electrically connected to a first power stage of the first electric propulsion unit. The second battery pack may be electrically connected to a second power stage of the first electric propulsion unit and a first power stage of the second electric propulsion unit. Should the main controller determine that there is a charge differential and the charge differential indicates that the first battery pack holds a higher charge than the second battery pack, the main controller may increase power draw from the first battery pack to the first power stage of the first electric propulsion unit, increase power draw from the second power stage of the first electric propulsion unit to the second battery pack, and increase power draw from the second battery pack to the first power stage of the second electric propulsion to provide the additional power to the second electric propulsion unit.

According to some embodiments, the main controller may be configured to control power transfer between the battery packs through the electric propulsion unit based on the determined charge differential between the first battery pack and the second battery pack. The charge differential may be a difference between a higher charged battery pack and a lower charged battery pack. The charge differential may depend on environmental conditions, flight operations, or level of performance of an EPU, or a combination thereof. The charge differential may be indicative of how much power is being drawn from the first battery pack by the connected first electric propulsion unit. In some embodiments, a charge differential can be due to a failure of an electric propulsion unit in which case the energy stored in the battery configured for supplying power to the failed electric propulsion unit may be redirected to another battery pack and/or to another electric propulsion unit For example, should an electric propulsion unit fail, a battery pack powering a power stage of the failed electric propulsion unit may have a portion of its charge transferred to another battery pack through another electric propulsion unit since the portion of its charge will not be used for the failed electric propulsion unit. In this way, the battery pack's charge can be used to power a different electric propulsion unit to pick up the slack due to the failed electric propulsion unit.

According to some embodiments, the power distribution system is configured to transfer power between different battery packs to accommodate changes in discharge rates of the battery packs by one or more electric propulsion units of an electric aircraft. The discharge rates of the battery pack may change, for example, due to environmental conditions, performance of an electric propulsion unit, failure of a power stage of an electric propulsion unit, failure of a battery pack, or a combination thereof. Significant changes in discharge rates may result in an imbalance or inadequate distribution of power draw across battery packs of the electric aircraft. An imbalance or inadequate distribution of power may include, for example, overloading a battery pack, not efficiently distributing stored power in a battery pack, existence of a charge differential between one or more battery packs, or a combination thereof. In some embodiments, to limit imbalance or inadequate distribution of power draw across the battery packs due to a change in discharge rates, the power distribution system may be configured to control power draw from the battery packs of the electric aircraft. For example, should a main controller of the power distribution system determine that a first battery pack is being discharged at an increased discharge rate by a first electric propulsion unit connected to the first battery pack and to a second battery pack, the main controller may increase a power draw from the second battery pack to the first electric propulsion unit to prevent the first electric propulsion unit from discharging the first battery pack above a threshold.

According to some embodiments, a main controller of the power distribution system may transfer power between battery packs through one or more electric propulsion units based on aircraft operations and/or environmental conditions. For example, one or more battery packs may experience an increase in discharge rate by one or more electric propulsion units due to operation of the electric aircraft in hover mode in the presence of a crosswind. In this example, some electric propulsion units of the electric aircraft may drive harder than other electric propulsion units due to the crosswind, and as a result, the harder driving electric propulsion units discharge their respective one or more battery packs at a different rate compared to discharge rates associated with other electric propulsion units and their respective one or more battery packs. To prevent overloading of the one or more battery packs powering the harder driving electric propulsion units, power may be transferred from other battery packs to the one or more battery packs that power the harder driving electric propulsion units through power stages of electric propulsion units. Such power distribution across the electric aircraft results in more balanced power distribution compared to controlling power draws of individual batteries in attempt to balance power.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a", "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

As used herein, the term "proprotor" refers to a variable pitch propeller that can provide thrust for vertical lift and for forward propulsion by varying the pitch of the propeller.

As used herein, the term "battery pack" means any combination of electrically connected batteries (i.e., battery cells) and can include a plurality of batteries arranged in series, parallel, or a combination of series and parallel.

Figure 1B:
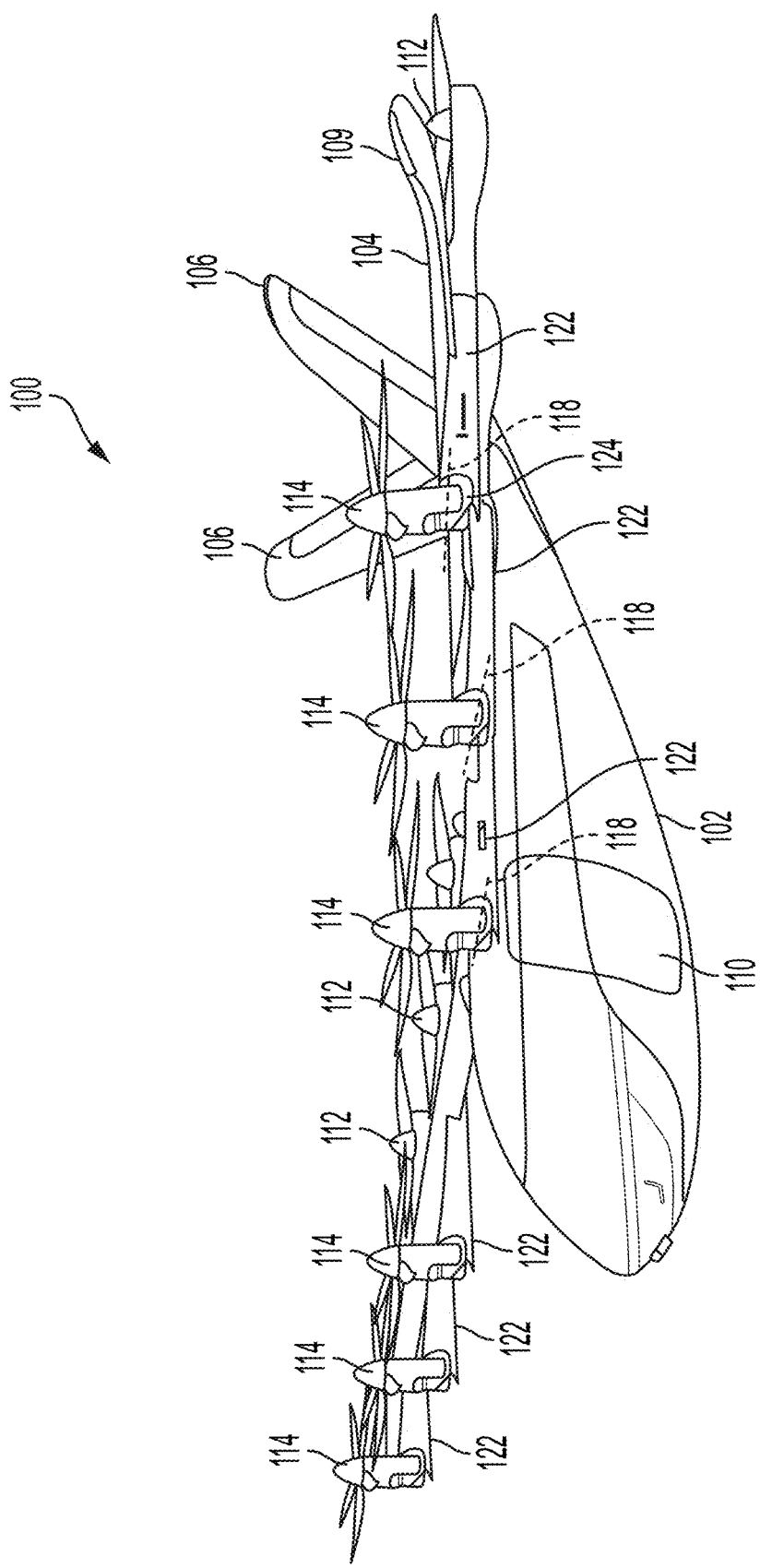
FIG. 1B shows a VTOL aircraft in a takeoff and landing configuration, according to various embodiments.

FIGS. 1A and 1B illustrate a vertical take-off and landing (VTOL) aircraft 100 in a cruise configuration and a vertical take-off and landing configuration, respectively, according to some embodiments. Exemplary embodiments of a VTOL aircraft according to some embodiments are discussed in U.S. patent application Ser. No. 16/878,380 (titled "Vertical Take-Off and Landing Aircraft" and filed May 19, 2020) and in U.S. patent application Ser. No. 16/923,939 (titled "Systems and Methods for Power Distribution in Electric Aircraft" and filed Jul. 8, 2020), the entire contents of both patent applications are incorporated herein by reference.

The aircraft 100 includes a fuselage 102, wings 104 mounted to the fuselage 102, and one or more rear stabilizers 106 mounted to the rear of the fuselage 102. The aircraft 100 includes a plurality rotors 112 and a plurality of proprotors 114 (collectively referred to herein as electric propulsion units, EPUs). The EPUs (112, 114) generally include an electric motor driving a fan (a plurality of blades) and a motor controller for controlling/powering the motor. As discussed further below with respect to FIGS. 2-4, an EPU can include a plurality of partial motors (power stages) that can independently drive the fan and can be controlled by a plurality of separate motor controllers.

Rotors 112 are mounted to the wings 104 and are configured to provide lift for vertical take-off and landing. Proprotors 114 are mounted to the wings 104 and are tiltable between lift configurations in which they provide a portion of the lift required for vertical take-off and landing and hovering, as shown in FIG. 1B, and propulsion configurations in which they provide forward thrust to the aircraft 100 for horizontal flight, as shown in FIG. 1A. As used herein, a proprotor lift configuration refers to any proprotor orientation in which the proprotor thrust is providing primarily lift to the aircraft and a proprotor propulsion configuration refers to any proprotor orientation in which the proprotor thrust is providing primarily forward thrust to the aircraft.

According to some embodiments, the rotors 112 are configured for providing lift only, with all propulsion being provided by the proprotors. Accordingly, the rotors 112 may be in fixed positions. During take-off and landing, the proprotors 114 are tilted to lift configurations in which their thrust is directed downwardly for providing additional lift.

For forward flight, the proprotors 114 tilt from their lift configurations to their propulsion configurations. In other words, the pitch of the proprotors 114 is varied from a pitch in which the proprotor thrust is directed downward to provide lift during vertical take-off and landing and during hover to a pitch in which the proprotor thrust is directed rearward to provide forward thrust to the aircraft 100. The proprotors tilt about axes 118 that are perpendicular to the forward direction of the aircraft 100. When the aircraft 100 is in full forward flight, lift may be provided entirely by the wings 104, and the rotors 112 may be shut-off. The blades 120 of the rotors 112 may be locked in low drag positions for aircraft cruising. In some embodiments, the rotors 112 each have two blades 120 that are locked for cruising in minimum drag positions in which one blade is directly in front of the other blade as illustrated in FIG. 1A. In some embodiments, the rotors 112 have more than two blades. In some embodiments, the proprotors 114 include more blades 116 than the rotors 112. For example, as illustrated in FIGS. 1A and 1B, the rotors 112 may each include two blades and the proprotors 114 may each include five blades. According to some embodiments, the proprotors 114 can have from 2 to 5 blades.

According to some embodiments, the aircraft includes only one wing 104 on each side of the fuselage 102 (or a single wing that extends across the entire aircraft) and at least a portion of the rotors 112 are located rearward of the wings 104 and at least a portion of the proprotors 114 are located forward of the wings 104. In some embodiments, all of the rotors 112 are located rearward of the wings 104 and all of the proprotors are located forward of the wings 104. According to some embodiments, all rotors 112 and proprotors 114 are mounted to the wings—i.e., no rotors or proprotors are mounted to the fuselage. According to some embodiments, the rotors 112 are all located rearwardly of the wings 104 and the proprotors 114 are all located forward of the wings 104. According to some embodiments, all rotors 112 and proprotors 114 are positioned inwardly of the wing tips 109.

According to some embodiments, the rotors 112 and proprotors 114 are mounted to the wings 104 by booms 122. The booms 122 may be mounted beneath the wings 104, on top of the wings, and/or may be integrated into the wing profile. According to some embodiments, one rotor 112 and one proprotor 114 are mounted to each boom 122. The rotor 112 may be mounted at a rear end of the boom 122 and a proprotor 114 may be mounted at a front end of the boom 122. In some embodiments, the rotor 112 is mounted in a fixed position on the boom 122. In some embodiments, the proprotor 114 is mounted to a front end of the boom 122 via a hinge 124. The proprotor 114 may be mounted to the boom 122 such that the proprotor 114 is aligned with the body of the boom 122 when its in propulsion configuration, forming a continuous extension of the front end of the boom 122 that minimizes drag for forward flight.

According to some embodiments, the rotors 112 and/or proprotors 114 are configured to have relatively low tip speed to decrease the amount of noise generated by the aircraft. In some embodiments, the tip speed of the rotor blades is about 0.4 Mach in hover. According to various embodiments, the diameter of the rotor and/or proprotor blades is the range of 1 to 5 meters, preferably in the range of 1.5 to 2 meters.

According to some embodiments, the aircraft 100 may include only one wing on each side of the aircraft 100 or a single wing that extends across the aircraft. According to some embodiments, the at least one wing 104 is a high wing mounted to an upper side of the fuselage 102. According to some embodiments, the wings include control surfaces, such as flaps and/or ailerons. According to some embodiments, the wings can have curved wing tips 109 for reduced drag during forward flight.

According to some embodiments, the rear stabilizers 106 include control surfaces, such as one or more rudders, one or more elevators, and/or one or more combined rudder-elevators. The wing(s) may have any suitable design. In some embodiments, the wings have a tapering leading edge 123, as shown for example, in the embodiment of FIG. 1A. In some embodiments, the wings have a tapering trailing edge.

According to some embodiments, the aircraft 100 is operated during take-off and landing by positioning the proprotors 114 in lift configurations and providing the required lift to the aircraft 100 via the combined lift provided by the rotors 112 and proprotors 114. According to some embodiments, during vertical take-off and landing and/or hover, the proprotors 114 can be maintained in predetermined lift configurations that can be the same across all proprotors or different for different proprotors. According to some embodiments, the tilt of at least some of the proprotors can be actively adjusted during take-off and landing and/or hover to provide the required stability and/or maneuvering. According to some embodiments, the tilt of at least one proprotor is actively controlled by the flight controller during take-off, landing, and/or hover to generate yawing moments.

According to some embodiments, each rotor 112 and/or each proprotor 114 can be individually controlled by the flight controller according to the various operational degrees of freedom. According to various embodiments, the only degree of freedom of the rotor is the rotational speed of the rotor. In some embodiments, the angle of attack of the blades of the rotors can be collectively adjusted, providing an additional degree of freedom. According to some embodiments, the degrees of freedom of at least a portion of the proprotors includes the rotational speed of the proprotors, the collective attack angle of the blades, and the degree of tilt of the proprotors. According to some embodiments, any of these degrees of freedom can be actively controlled by the flight controller (either autonomously or in response to pilot commands) during take-off and landing in order to provide the appropriate stability and maneuvering.

Once the aircraft 100 has achieved sufficient altitude to commence forward flight, the proprotors 114 begin tilting forward toward their propulsion configurations such that their thrust provides a combination of lift and thrust, with a decreasing proportion of lift as the proprotors 114 are tilted further toward their propulsion configurations. The rotors 112 can remain active during at least a portion of the period in which the proprotors are tilted forward to continue to provide rotor-based lift. At any point after the forward airspeed is high enough that the wings provides sufficient lift to maintain the aircraft's altitude, the rotors 112 can be deactivated. As discussed above, the rotor blades can be locked in a low-drag position.

During cruising, the rotors 112 remain deactivated. The control surfaces of the wings 104 and/or rear stabilizers 106 can be used for aircraft maneuvering and stability in a conventional manner. According to some embodiments, should a battery pack be lost during forward flight, resulting in the loss of the power provided by the portion of the proprotors 114 powered by the lost battery pack, the aircraft 100 can compensate via use of the control surfaces and/or via adjustment in power from the unaffected portion of the proprotors.

According to some embodiments, the tilt of at least some of the proprotors can be actively controlled to provide additional stability and/or maneuverability control. In some embodiments, the tilt of at least some of the proprotors is actively controlled during take-off and landing and/or hover. In some embodiments, the tilt of the proprotors is fixed (i.e., non-varying) during cruise. According to some embodiments, the tilt of the outermost proprotors can be actively and independently controlled during vertical take-off and landing and/or hover to provide yawing moments as needed.

Figure 2:
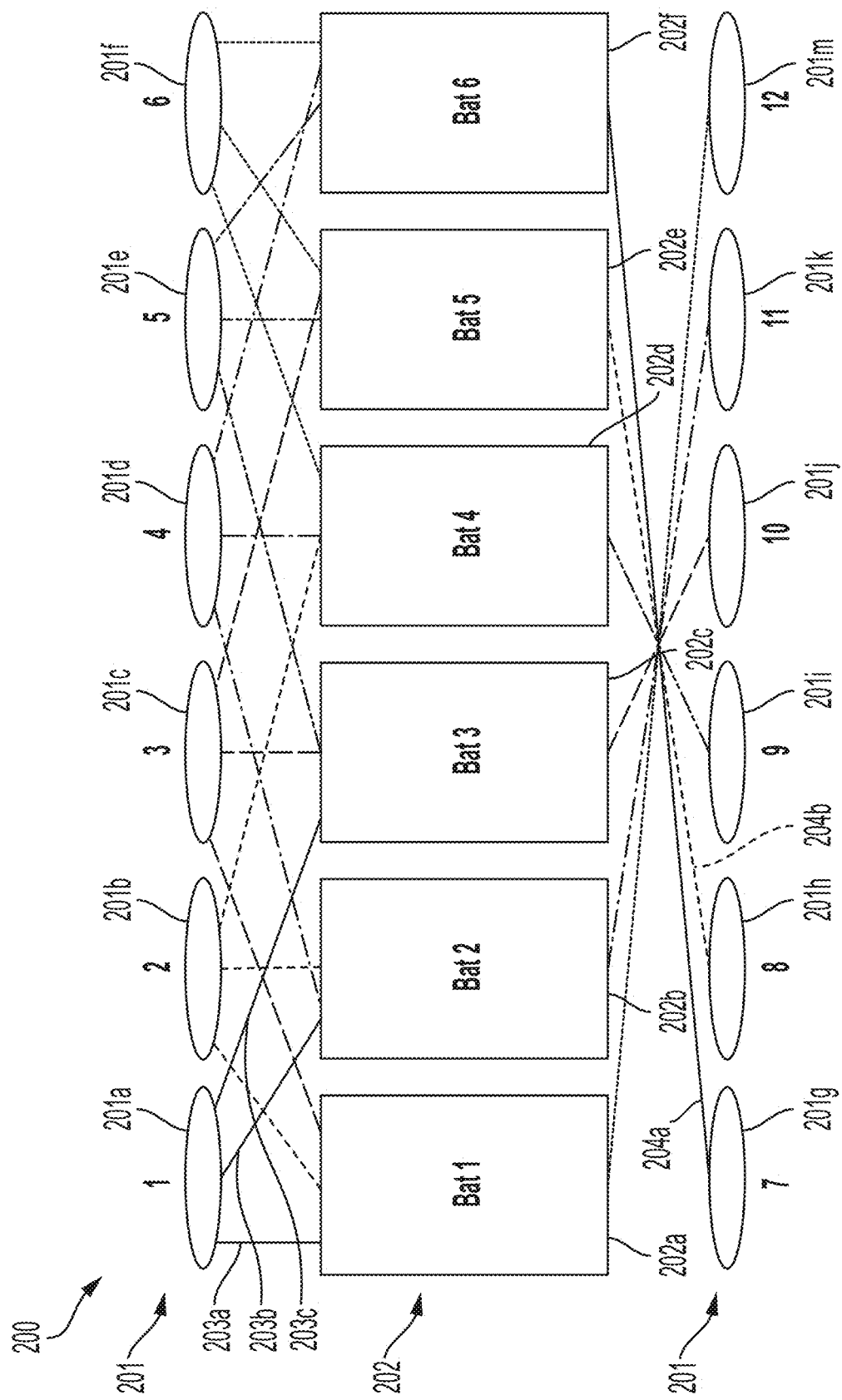
FIG. 2 illustrates a power distribution architecture for powering electric propulsion units of an aircraft, according to various embodiments.

FIG. 2 illustrates an example power distribution system in which power can be transferred between different battery packs through the power stages of at least a portion of the EPUs of an aircraft (such as aircraft 100), according to some embodiments. One or more of the EPUs can have one or more power stages that are each connected to one battery pack. In the illustrated example of FIG. 2, there are six EPUs 201a-f that each have three power stages, each of which is connected to a different battery pack 202, and six EPUs 201g-m that each have a single power stage each connected to a different battery pack 202. For example, according to some embodiments, EPU 201a has a first stage connected to battery pack 202a via distribution line 203a, a second stage connected to battery pack 202b via distribution line 203b, and a third stage connected to battery pack 202c via distribution line 203c. EPU 201g has a single stage connected to only battery pack 202f via distribution line 204a. As shown in FIG. 2, the remaining EPUs 201b-201f have the same number of power stages as EPU 201a, however, with the different distribution lines between the power stages and battery packs. Likewise, the remaining EPUs 201h-m have the same number of power stages as EPU 201g, however, with different distribution lines between the power stages and the battery packs. According to some embodiments, two or more power stages of an EPU may be connected to a same battery pack. For example, an EPU may have a first stage connected to first battery pack via first distribution line, a second stage connected to second battery pack via a second distribution line, and a third stage connected to the second battery pack via a third distribution line.

The connection of each power stage of EPUs 201 to a battery pack of battery packs 202 allows power transfer between different battery packs 202 through the EPUs 201. In this way, should an EPU require additional power due to environmental conditions, a level of performance of another EPU (such as EPU underperformance or failure), or a combination thereof-power may be transferred between battery packs through the EPUs via the distribution lines to provide additional power where needed.

According to some embodiments, power may be transferred from a first battery pack to a second battery pack through power stages of one or more EPUs. For example, power may be transferred from the first battery to the first power stage, through the power stages of the EPU via electromagnetic coupling of the power stages and the rotor of the EPU, and from the second power stage to the second battery pack. Power transferred from the first battery pack to the second battery pack through the EPU may be stored and/or transferred to other battery packs, other EPUs, or a combination thereof. According to some embodiments, the first battery pack may be electrically isolated from the second battery pack and power may be transferred from the first battery pack to the second battery pack while maintaining electrical isolation between the first battery pack and the second battery pack.

According to some embodiments, power transferred between battery packs through power stages of EPUs may include transfer of electric power regenerated from one or more EPUs. For example, power from a first battery pack may be used by a first power stage to generate excess torque on the rotor of the EPU, and the excess torque may be used to drive the second power stage to generate electricity to charge the second battery pack connected to the second power stage. The energy transferred to charge the second battery pack may be made available for use by the EPU, such as during a high power demand operation, and/or to other EPUs.

According to some embodiments, a main controller of a power distribution system may assess power requirements of an aircraft, and based on the assessment the main controller may control how a power stage of an EPU is used to transfer power from one or more battery packs through the EPU. That is, the main controller may control power transfer from a first battery pack through power stages of an EPU to a second battery pack based on assessed power requirements of the aircraft. According to some embodiments, the first power stage of EPU 201a may draw power from the first battery pack 202a through distribution line 203a and the second power stage of EPU 201a may draw power from the second battery pack 202b through distribution line 203b to generate torque. Should the main controller determine that the first and/or second battery packs have excess charge over and above an amount required for driving the EPU and that the third battery pack may benefit from excess charge, the main controller may control the first and second power stages of EPU 201a to generate excess torque, which the third power stage of EPU 201a can use to generate electricity to charge the third battery pack 202c through distribution line 203c. According to some embodiments, the excess charge may be based on a charge differential between each of the battery packs. The charge differential may indicate that one battery pack stores more charge than another battery pack. The energy transferred to the third battery pack 202c may be stored in the third battery pack 202c and made available for other uses. Other uses may include transferring power from the third battery pack 202c to other battery packs through power stages of EPUs (such as EPU 201a, 201c, and 201e) electrically connected to battery pack 202c. According to some embodiments, at least two of the power stages of EPU 201a may be configured to draw power from battery packs. According to some embodiments, at least one of the power stages of EPU 201a may be configured to regenerate electricity from excess torque from EPU 201a.

According to some embodiments, a power distribution system may transfer power across an aircraft (such as aircraft 100), as needed, between battery packs through EPUs of the aircraft. The transfer of power may be based on changes in discharge rates of one or more battery packs. As described above, changes in discharge rates may be due to environmental conditions, performance of an electric propulsion unit, failure of a power stage of an electric propulsion unit, failure of a battery pack, or a combination thereof. For example, in reference to FIG. 2, should EPU 201m positioned on the right side of an aircraft fail during cruise flight, then battery pack 202a will no longer be discharged by EPU 201m. The remaining battery power of battery pack 202a that was intended to power a functioning EPU 201m may be transferred to other EPUs. Specifically, in this example, the stored energy of battery pack 202a may be transferred to EPUs on the right side of the aircraft to help achieve power/C-rate requirements for safe and efficient operation despite the failure of EPU 201m.

Figure 3:
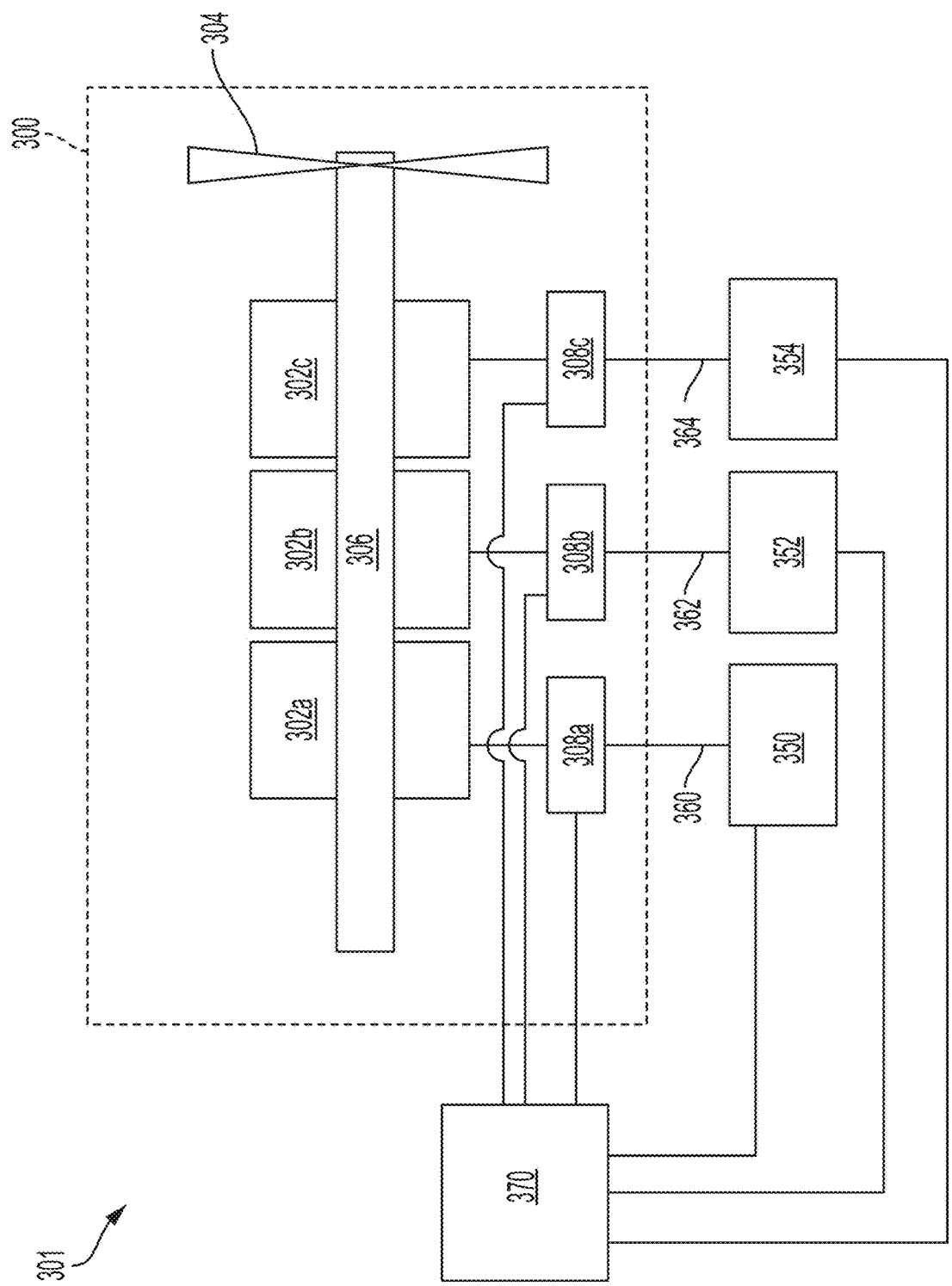
FIG. 3 is a block diagram of a portion of the power distribution to an electric propulsion unit that includes three power stages, according to various embodiments.
Figure 4:
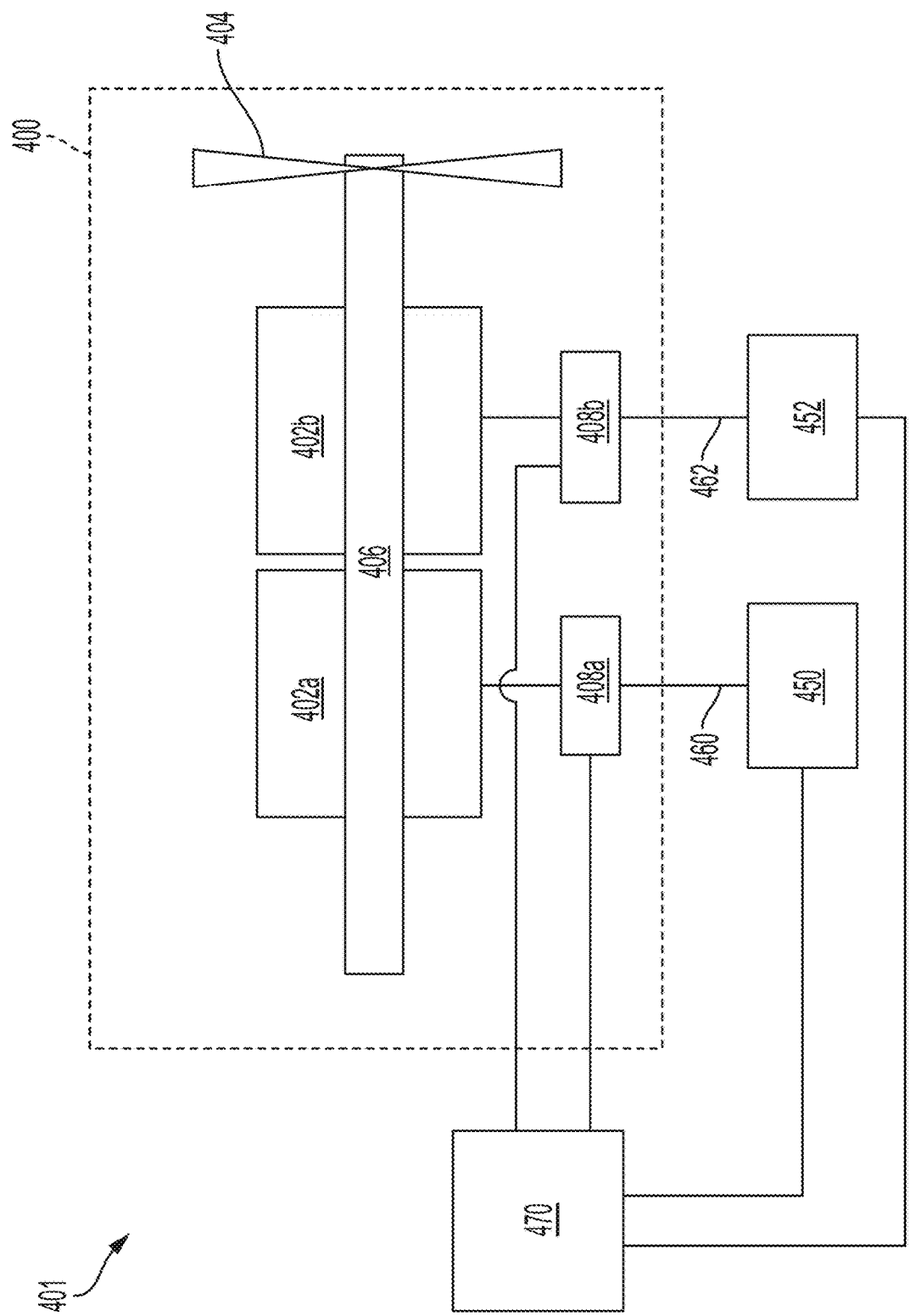
FIG. 4 is a block diagram of a portion of the power distribution to an electric propulsion unit that includes two power stages, according to various embodiments.

According to some embodiments, an EPU may include a minimum of two power stages for transferring power between battery packs connected to the power stages. An example of an EPU having two power stages is shown in FIG. 4 (and will be described further below) and an example of an EPU having three power stages is shown in FIG. 3. Particularly, FIG. 3 shows an exemplary block diagram of a portion of a power distribution system 301 (such as system 200) that includes an EPU 300 (such as EPUs 201a-f) that includes three power stages, according to some embodiments. According to some embodiments, EPU 300 includes fan blades 304 that can provide thrust as power is transferred from one battery pack connected to EPU 300 to another battery pack connected to EPU 300 through the power stages 302a-302c of EPU 300.

According to some embodiments, the power stages 302a-c can operate to drive the fan blades 304 to generate torque required for operation of EPU 300 and generate excess torque that may be utilized by one or more power stages 302a-c of EPU 300 to generate electricity. An amount of excess torque may be based on a pre-determined torque margin of the EPU 300. The generated electricity can be used to charge one or more battery packs 350, 352, 354 connected to the one or more power stages 302a-c. The power generated and regenerated may be based on how the power stages are driven by their respective motor controllers.

Each power stage may be controlled by a motor controller. For example, as shown in FIG. 3, each power stage 302a, 302b, 302c of EPU 300 includes a set of windings controlled by a motor controller 308a-308c. The set of windings of each power stage of EPU 300 may be interwound. The power stages 302a, 302b, 302c can be electromagnetically coupled to the rotor (shaft 306) of EPU 300 and power can be transferred between the battery packs 350, 352, 354 by one of the power stages creating additional torque on the rotor (above the amount required to provide the thrust required of the EPU) and another of the power stages using that additional torque to generate electricity. As shown in the example of FIG. 3, power stage 302a and motor controller 308a are powered by battery pack 350 via power distribution bus 360, power stage 302b and motor controller 308b are powered by battery pack 352 via power distribution bus 362, and power stage 302c and motor controller 308c are powered by battery pack 354 via power distribution bus 364. According to some embodiments, each battery pack is electrically isolated from other battery packs.

According to some embodiments, the power distribution system 301 may include a main controller 370 configured to control the motor controllers 308a-308c of each power stage 302a-302c for transferring power between at least two of the battery packs 350, 352, 354 through the first power stage 302a, the second power stage 302b, and the third power stage 302c. According to some embodiments, the main controller 370 may determine power required to achieve a desired thrust from EPU 300, may detect charge status of each battery pack 350, 352, 354 connected to EPU 300, and determine charge differentials between each battery pack 350, 352, 354 relative to one another based on the detected charge statuses. The determined power required may be power required from the first stage 302a to achieve a desired thrust from EPU 300. The charge status of a battery pack may include an amount of charge remaining in the battery pack, a rate of discharge of the battery pack, or a combination thereof. As explained above, discharge rates of a battery pack may depend on operation of EPU 300 (such as hover, forward climb, forward flight) and environmental conditions (such as temperature, pressure, and wind). Based on the determined power required, the detected battery statuses, and the determined charge differentials, the main controller 370 may control power stages 302a-302c to generate an amount of torque required to achieve the desired thrust from EPU 300, create additional torque on the rotor (above the amount required to provide the thrust required from EPU 300), and use at least some of the additional torque to generate electricity to charge one or more of the battery packs 350, 352, 354.

According to some embodiments, for one or more EPUs of electric aircraft, the main controller 370 may determine power required of the one or more EPUs to achieve a desired thrust from each EPU, detect battery statuses of each battery pack connected to the one or more EPUs, determine charge differentials between the battery packs connected to the one or more EPUs, and control power stages of the one or more EPUs pursuant to the above determinations. For example, should the main controller 370 determine that there is a charge differential between battery pack 350 and battery pack 352 that indicates battery pack 350 has a higher charge than battery pack 352, the main controller 370 may increase power draw from battery pack 350 to the first power stage 302a of EPU 300 and increase power draw from the second power stage 302b of EPU 300 to battery pack 352 to charge battery pack 352. According to some embodiments, battery pack 352 may be connected to a third power stage of the other EPU and the main controller 370 may increase power draw from battery pack 352 to the third power stage of the other EPU to power the other EPU to achieve the desired thrust of the other EPU. In this way, EPUs controlled by the main controller generate desired thrust required for flight and regenerate electricity from the excess torque to transfer power to one or more EPUs or charge one or more battery packs.

According to some embodiments, an EPU may include a minimum of two power stages for transferring power between battery packs connected to the power stages. FIG. 4 shows an exemplary block diagram of a portion of a power distribution system 401 that includes an EPU 400 that includes two power stages 402a, 402b, according to some embodiments. According to some embodiments, the power stages 402a, 402b may drive the fan blades 404. Similar to power stages 302a-302c, according to some embodiments, the power stages 402a, 402b can be controlled by main controller 470 to drive the fan blades 404 to generate torque required for operation of EPU 400 and generate excess torque to regenerate electric power that may be utilized by one or more other EPUs. The generated torque and generated excess torque may be based on how the power stages are driven by their respective motor controllers that are controlled by the main controller 470.

Similar to the power distribution system 301 of FIG. 3, the power distribution system 401 may include motor controllers for each power stage. As shown in the example of FIG. 4, the power stage 402a and motor controller 408a of EPU 400 are powered by battery pack 450 via power distribution bus 460, and power stage 402b and motor controller 408b of EPU 400 are powered by battery pack 452 via power distribution bus 462. According to some embodiments, and similar to descriptions regarding FIGS. 2 and 3, the power stages 402a, 402b can be electromagnetically coupled to the rotor (shaft 406) of EPU 400 and power can be transferred between the battery packs 450, 452, by one of the power stages creating additional torque on the rotor (above the amount required to provide the thrust required of the EPU) and another of the power stages using that additional torque to generate electricity. The battery packs 450, 452 may be electrically isolated from each other. Similar to descriptions of power distribution system 301, the power distribution system 401 may include a main controller 470 configured to control the motor controllers 408a, 408b of each power stage 402a-402b for transferring power between battery packs 450, 452 through EPU 400. Similar to main controller 370, the main controller 470 may determine power required to achieve a desired thrust from EPU 400, may detect charge status of each battery pack 450, 452, determine charge differentials between each battery pack 450, 452 connected to EPU 400 relative to one another based on the detected charge statuses, and main controller 470 may control power stages 402a-402b to generate an amount of torque required to achieve the desired thrust from EPU 400, create additional torque on the rotor (above the amount required to provide the thrust required from EPU 300), and use at least some of the additional torque to generate electricity to charge one or more of the battery packs 450, 452. The main controller 470 may control power transfer for battery packs connected to one or more EPUs of the aircraft.

According to some embodiments, an amount of power available for transfer between one battery pack and another battery pack may be based on a charge differential between the one battery pack and the other battery pack, an available power margin of the EPU, or a combination thereof. According to some embodiments, the available power margin of an EPU may be dependent on flight operation, a number of EPUs used during the flight operation, and a number of power stages of the EPUs used during the flight operation. For example, for an aircraft (such as aircraft 100) in cruise, one or more EPUs of the aircraft may be configured to achieve an overall cruise power required for the aircraft. Each of the one or more EPUs may include a motor and each motor may be configured to provide a power based on the overall cruise power and the number of EPUs outputting power to achieve the overall cruise power. For example, an expected power output from an EPU used during cruise may be the overall cruise power divided by the number of EPUs used during cruise. Each EPU may spin at a given speed (RPM) and be configured to provide torque from a minimum torque ($T_{min}$) to a maximum torque ($T_{max}$). The maximum amount of torque from a motor is typically not used unless, for example, another motor fails or a battery pack fails. Instead, a main controller of the motor determines a required torque that allows the EPU to output a power required to achieve a desired thrust from the EPU. The positive difference between actual torque generated and the required torque is excess torque that can be utilized to regenerate electric power that can be used to power one or more EPUs or charge a battery pack.

According to some embodiments, each EPU may include at least two power stages. For n power stages of an EPU, every power stage could be driven at maximum torque of $T_{max}/n$ N-m. Driving each thrust-providing power stage at its maximum rated torque capability results in a minimum number of power stages for achieving a desired power output. According to some embodiments, spinning the motors at higher speeds to provide the same amount of thrust results in less torque needed per power stage and a higher amount of power available for transfer. The "non-used"

power stages (or fractions thereof) could then be used to provide positive torque in (part of) one stage and negative torque (regeneration) in (part of) another stage for transferring power from one stage/battery to the next stage/battery. Therefore, the power stages of a motor may be operated to generate torque, generate excess torque, and regenerate electric power from the excess torque. Thus, as described herein, each power stage may effectively operate as either a motor or a generator.

According to some embodiments, a power distribution system of an aircraft may include EPUs that are configured to spin without driving a detachably connected propeller. For example, an EPU having a detachably connected propeller may disconnect its propeller (for example, through a clutch) and thus may spin without driving its propeller when the propeller is disconnected. That is, the EPU may spin and drive its propeller when the propeller is connected, and may spin without driving its propeller when its propeller is disconnected. According to some embodiments, EPUs that include a detachable propeller may be aft EPUs (such as EPUs 112) positioned rearward of the wings (such as 104) of an aircraft.

According to some embodiments, power may be transferred between one battery pack and another battery through an EPU that includes a detachably connected propeller. An amount of power available from such an EPU may be dependent on flight operation and whether the detachably connected propeller of the EPU is connected or disconnected from the EPU. An EPU that is detached from its propeller is not used during forward flight (climb/cruise), and therefore does not have a required cruise power. An EPU that is detached from its propeller and not used to provide the required cruise power has the capability of transferring power (up to half maximum rated power of the EPU) from one battery pack to another battery pack through the power stages of the EPU.

According to some embodiments, a power distribution system of an aircraft may include a pusher motor that can operate as an auxiliary motor to transfer power between battery packs of an aircraft (such as aircraft 100) through the pusher motor. That is, a pusher motor may be configured to provide power during flight operations that require more power than can be supplied by the battery packs of the aircraft. Similar to the above description in reference to EPUs 201, a pusher motor may include multiple power stages configured to transfer power between battery packs of the aircraft. According to some embodiments, the pusher motor may be configured to spin without driving a propeller. For example, the pusher motor may not be connected to a propeller or may be detachably connected to a propeller. In the case of a pusher motor being detachably connected a propeller, the pusher motor may disconnect from the propeller of the pusher motor (e.g. through a clutch)—the pusher motor disconnected from its propeller allows the pusher motor to spin while its propeller remains stationary. The pusher motor disconnected from its propeller (or not connected to a propeller at all) may spin and transfer power between battery packs of an electric aircraft through the multiple power stages of the pusher motor, each of which is connected to a different battery pack. Alternatively, the pusher motor that is not connected to a propeller. In this way, additional power may be transferred to one or more battery packs through the spinning pusher motor.

Figure 5:
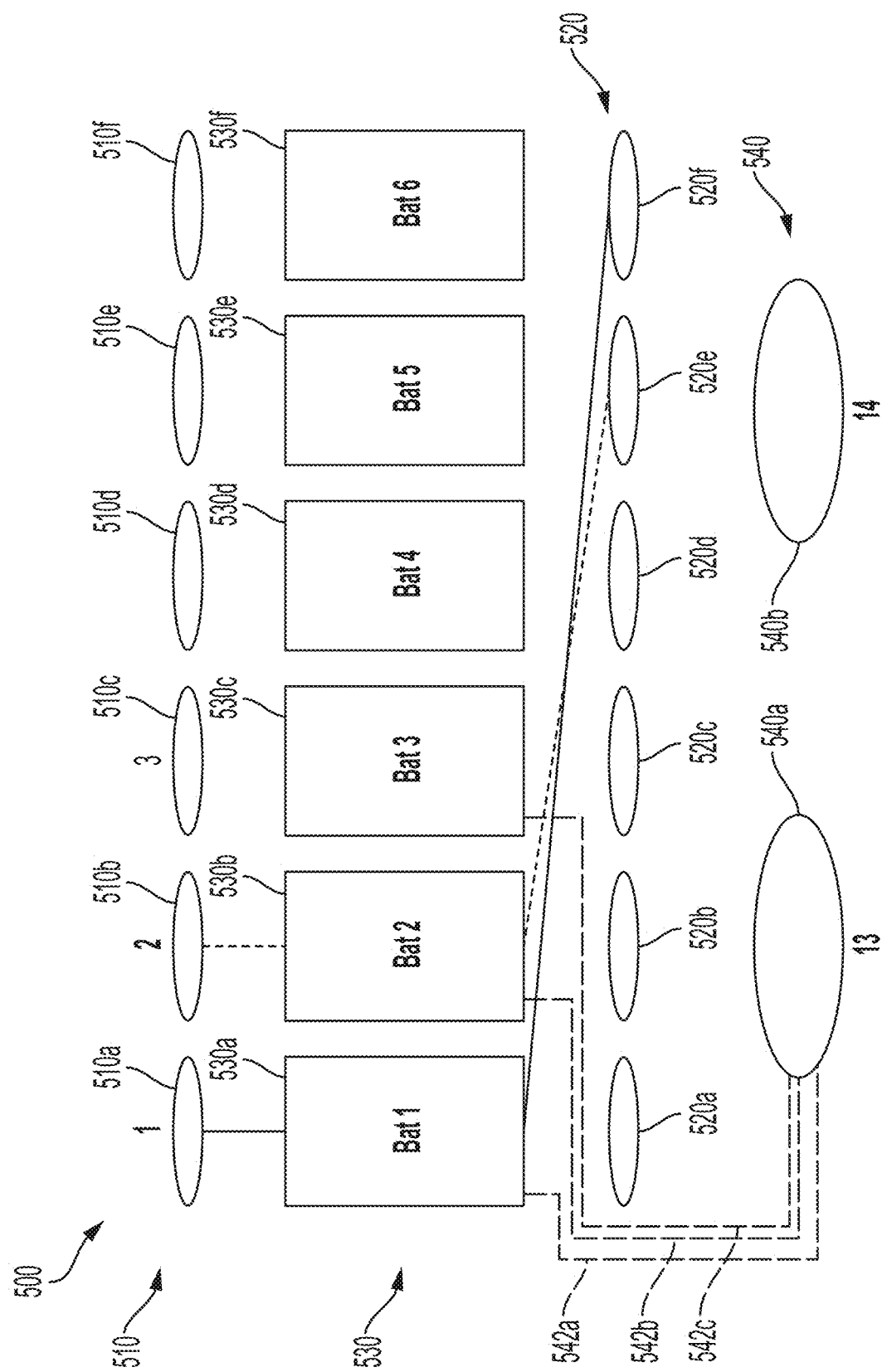
FIG. 5 illustrates a power distribution architecture for powering electric propulsion units of an aircraft that includes pusher motors, according to various embodiments.

FIG. 5 shows an exemplary power distribution system 500 for an aircraft (such as aircraft 100) that includes pusher motors 540 (540*a*, 540*b*), a first set of EPUs 510*a*-510*f* (such as EPUs 201*a*-201*f*), a second set of EPUs 520*a*-520*f* (such as EPUs 201*g*-201*m*), and a plurality of battery packs 530*a*-530*f* (such as battery packs 202*a*-202*f*) connected to one or more EPUs of EPUs 510, 520. For illustrative purposes, example electrical connections are shown for EPUs 510*a*, 510*b*, 520*e*, and 520*f*. The pusher motors 540, each including two or more power stages and a disconnectable propeller or no propeller at all, may operate as auxiliary sources for transferring power.

According to some embodiments, during flight operations, there may exist charge differentials between two or more battery packs of battery pack 530. The charge differential may be a difference between a higher charged battery pack and a lower charged battery pack. The charge differential may depend on environmental conditions, flight operations, or level of performance of an EPU, or a combination thereof. According to some embodiments, should a battery pack of battery packs 530 hold a higher charge relative to another battery pack of battery pack 530, power may be transferred from the higher charged battery pack to the lower charged battery as needed through power stages of pusher motor 540*a*, 540*b* connected to its propeller or a pusher motor 540*a*, 540*b* disconnected from its propeller or having no propeller at all. When the pusher motor 540*a*, 540*b* is connected to its propeller, the pusher motor 540*a*, 540*b* may be configured to provide thrust to the aircraft and transfer power between battery packs connected to pusher motor 540*a*, 540*b* through the power stages of the pusher motor 540*a*, 540*b*. When the pusher motor 540*a*, 540*b* is disconnected from its propeller or does not include a propeller, the pusher motor 540*a*, 540*b* is not configured to provide thrust, but remains configured to transfer energy between battery packs connected to the pusher motor 540*a*, 540*b* through the power stages of the pusher motor 540*a*, 540*b*. According to some embodiments, for pusher motors having disconnectable propellers, the pusher motors 540*a*, 540*b* may be disconnected from their respective propellers should the aircraft require additional power transfer to one or more battery packs or one or more EPUs without a need for additional thrust from the pusher motors 540*a*, 540*b*.

For example, pusher motor 540*a* includes three power stages each electrically connected to either battery pack 530*a*, battery pack 530*b*, or battery pack 530*c*. When the pusher motor 540*a* is connected to its propeller, the pusher motor 540*a* may provide thrust for the aircraft and may transfer additional power between battery packs 530*a*-530*c* through the power stages of the pusher motor 540*a* via distribution lines 542*a*-542*c*. In this way, EPUs 510, 520 and pusher motors 540*a* may provide thrust for the aircraft. When the pusher motor 540*a* is disconnected from its propeller, the pusher motor 540*a* may spin while the propeller remains stationary. The pusher motor 540*a* disconnected from its propeller does not provide additional thrust to the aircraft since the propeller is stationary. However, the spinning pusher motor 540*a* disconnected from its propeller may transfer power between battery packs 530*a*-530*c* through the power stages of the pusher motor 540*a* via distribution lines 542*a*-542*c*.

Figure 6:
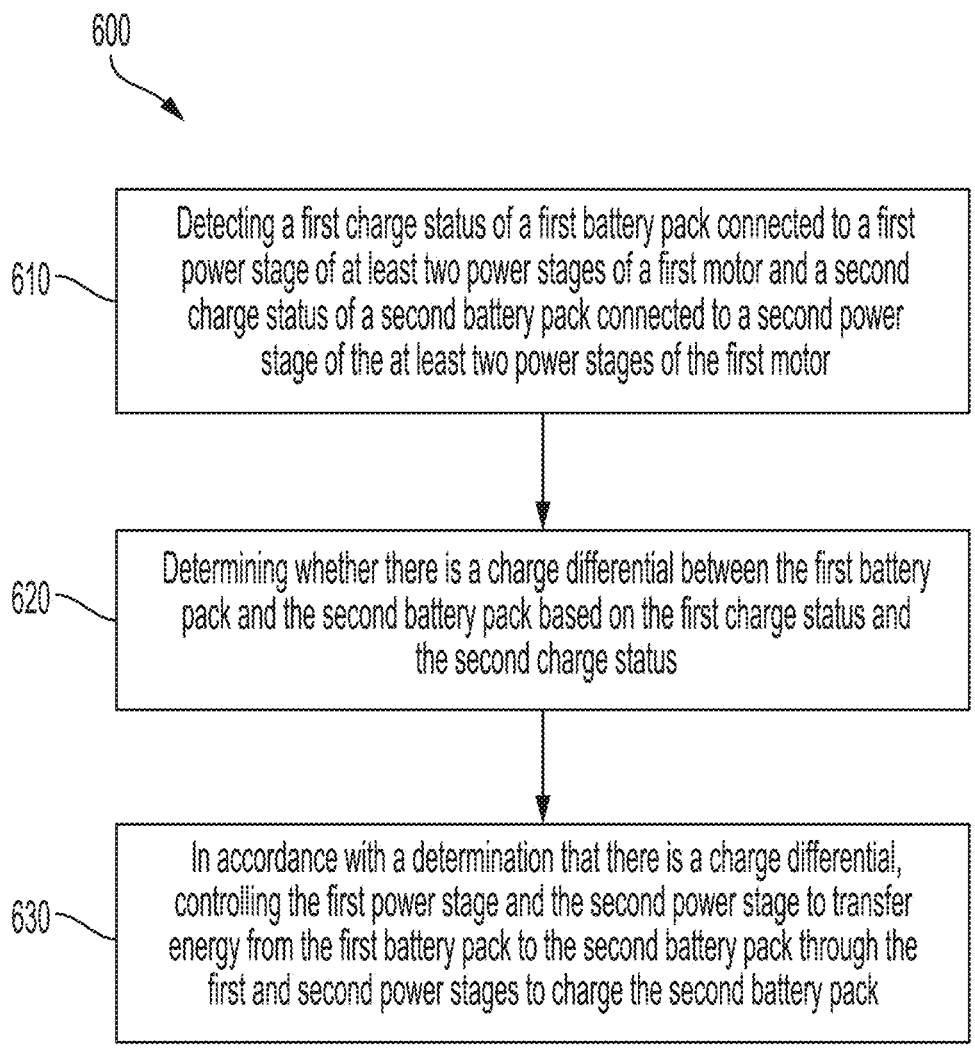
FIG. 6 is a flowchart of an exemplary method for controlling power transfer of an aircraft.

FIG. 6 shows a flowchart of an exemplary method 600 for controlling power transfer between battery packs through different power stages of an electric propulsion unit, according to some embodiments. The method 600 may be implemented in power distributions systems such as systems 200, 300, 400, 500. According to some embodiments, the method 600 may be implemented to control power transfer across an electric aircraft, such as aircraft 100.

At step 610, a first charge status of a first battery pack connected to a first power stage of at least two power stages of a first motor and a second charge status of a second battery pack connected to a second power stage of the at least two power stages of the first motor may be detected. According to some embodiments, the first charge status may include at least one of a battery charge of the first battery pack and a discharge rate for the first battery pack. Similarly, the second charge status may include at least one of a battery charge of the second battery pack and a discharge rate for the second battery pack.

At step 620, it may be determined whether there is a charge differential between the first battery pack and the second battery pack based on the first charge status and the second charge status. The charge differential is a difference in charge stored in the first battery pack relative to the second battery pack. Thus, determination that there is a charge differential may indicate that one battery pack has a higher level of charge than the other. Accordingly, the charge differential based on the charge statuses may indicate that a battery pack stores more energy relative to another battery pack. The charge differential may depend on environmental conditions, flight operations, or level of performance of the motor, or a combination thereof. According to some embodiments, the charge differential may be a non-negligible difference in charge levels between the first battery pack and the second battery pack, and thus the charge differential is indicative that the charge in the first battery pack is not equal to the charge of the second battery pack.

At step 630, in accordance with a determination that there is a charge differential, the first power stage and the second power stage may be controlled to transfer energy from the first battery pack to the second battery pack through the first and second power stages to charge the second battery pack. According to some embodiments, controlling power transfer from the first battery pack to the second battery pack through the power stages of the first motor may include increasing power draw from the first battery pack to the first power stage and increasing power draw from the second power stage to the second battery pack. Power may be transferred between battery packs through the first motor (via electromagnetic coupling between the power stages and the rotor of the first motor) as needed based on the determination of a charge differential.

According to some embodiments, a first electric propulsion unit may include the first motor that drives a propeller for achieving a desired thrust from the first electric propulsion unit. According to such embodiments, method 600 may include determining a power output required from the first stage of the first motor to achieve a desired thrust from the first electric propulsion unit, determining an available power margin based on the power output, and transferring energy from the first battery pack to the second battery pack through the power stages of the first motor based on the available power margin. According to some embodiments, the available power margin may be a difference of maximum power that the first electric propulsion unit can output and the power output required from the first stage to achieve a desired thrust from the first electric propulsion unit. According to some embodiments, energy may be transferred from the first battery pack to the second battery pack based on the available power margin and the charge differential between the first battery pack and the second battery pack.

According to some embodiments, controlling the first power stage and the second power stage to transfer energy may include controlling the first power stage of the first electric propulsion unit to generate torque on a rotor of the first motor in excess of an amount of torque required to achieve the desired thrust and controlling the second power stage of the first electric propulsion unit to generate electricity from excess torque for charging the second battery pack.

According to some embodiments, the second battery pack may be connected to a power stage of a second motor of a second electric propulsion unit. According to some embodiments, method 600 may include determining a power output required from the first power stage of the first electric propulsion unit to achieve a desired thrust from the first electric propulsion unit, determining a power output from the first power stage of the second electric propulsion unit to achieve a desired thrust from the second electric propulsion unit, and determining whether there is a charge differential between the first battery pack and the second battery pack. In accordance with a determination that there is a charge differential between the first battery pack and second battery pack that indicates the first battery pack stores more charge than the second battery pack, method 600 may include controlling the power stages of the first motor to generate an amount of torque required to achieve the desired thrust from the first motor, create additional torque on the rotor (above the amount required to provide the thrust required from the first electric propulsion unit), and use at least some of the additional torque to generate electricity to charge the second battery pack. According to some embodiments, the second battery pack can be used to power the power stage of the second electric propulsion unit to achieve the desired thrust from the second electric propulsion unit.

According to some embodiments, a main controller may control the power stages to generate required torque, generate excess torque, and regenerate electricity by controlling a motor controller for each power stage. For example, a main controller may control a first motor controller configured to control the first power stage and a second motor controller configured to control the second power stage. The first motor controller, at the direction of the main controller, may control the first power stage to generate torque required for providing a desired thrust from the first electric propulsion unit and torque in excess of the required torque. The second motor controller, at the direction of the main controller, may control the second power stage to use the excess torque to generate electricity which can charge the second battery pack.

According to some embodiments, the second battery pack may power a power stage of a second motor. The second battery pack may be connected to the power stage of the second motor and method 600 may include controlling the power stage of the second motor to provide power to the second motor from the charged second battery pack. According to some embodiments, the second battery pack may use energy transferred from another battery pack to charge the second battery pack, to supply power to the first motor, or to supply power to the second motor connected to the second battery pack, or a combination thereof.

The battery packs of the power distribution system can be located in any suitable locations of an aircraft, including in a fuselage and/or wings of the aircraft. The number and power of the electric propulsion units can be selected according to the desired performance parameters (e.g., target payload, airspeed, and altitude). According to some embodiments, the maximum power rating of one or more of the electric propulsion units is 500 kilowatts or less, preferably 200 kilowatts or less, more preferably 150 kilowatts or less. According to some embodiments, the maximum power rating of one or more of the electric propulsion units is at least 10 kilowatts, preferably at least 20 kilowatts, more preferably, at least 50 kilowatts. The aircraft can have an equal number of electric propulsion units that are rotors and proprotors, a greater number of electric propulsion units that are proprotors, or a greater number electric propulsion units that are rotors.

According to some embodiments, each battery pack is configured for a maximum stored energy of at least 1 kilowatt-hour or preferably at least 10 kilowatt-hours, and/or a maximum stored energy of at most 200 kilowatt-hours, preferably at most 100 kilowatt-hours, preferably at most 75 kilowatt-hours, more preferably at most 50 kilowatt-hours. According to some embodiments, the battery packs are configured so that their collective maximum stored energy is at least 1 kilowatt-hour or preferably at least 10 kilowatt-hours, and/or their maximum stored energy is at most 200 kilowatt-hours, preferably at most 100 kilowatt-hours, preferably at most 75 kilowatt-hours, or more preferably at most 50 kilowatt-hours. According to some embodiments, at least some of the battery packs at full charge provide a voltage of at least 100 volts, at least 500 volts, or at least 1000 volts. According to some embodiments, at least some of the battery packs at full charge provide at most 2000 volts, at most 1500 volts, at most 1000 volts, or at most 500 volts. According to some embodiments, nominal maximum voltage is between 500 and 1000 volts, preferably between 600 and 800 volts, or more preferably between 650 and 750 volts.

According to some embodiments, an electric aircraft as described herein can be configured to carry at least one person and up to 10 people, preferably up to 6 people, and more preferably up to 4 people. According to some embodiments, the aircraft is configured to be piloted and includes piloting controls. In some embodiments, the aircraft is configured to operate autonomously without any onboard pilot and with or without one or more passengers.

According to some embodiments, the aircraft is configured to carry up to 6 people (for example, a pilot and up to 5 passengers) up to 75 miles at a cruising speed of up to 150 miles per hour at an altitude of up to 3,000 feet above ground. In some embodiments, the aircraft is configured for 5 people, such as one pilot and four passengers. According to various embodiments, the maximum range on a single battery charge is 25 miles, 50 miles, 75 miles, 100 miles, or 200 miles.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and some embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A power distribution system for an electric aircraft comprising:
   a first electric propulsion unit comprising an electric motor for driving a propeller, the electric motor comprising at least two sets of windings;
   a first battery pack electrically connected to a first set of windings of the at least two sets of windings;
   a second battery pack electrically connected to a second set of windings of the at least two sets of windings; and
   a control system configured to control the first battery pack, the second battery pack, and the motor to transfer power from the first battery pack to the second battery pack through the first set of windings and the second set of windings.

2. The system of claim 1, wherein the control system is configured to determine a required power output of the first electric propulsion unit and a charge differential between the first battery pack and the second battery pack and control the battery packs and motor to transfer charge from the first battery pack to the second battery pack based on the required power output and charge differential.

3. The system of claim 1, wherein the first battery pack and the second battery pack are electrically isolated.

4. The system of claim 1, wherein the control system is configured to control the motor to create additional torque on a rotor via the first set of windings and the additional torque is used to generate electricity in the second set of windings.

5. The system of claim 1, wherein the control system comprises a first motor controller for the first set of windings, a second motor controller for the second set of windings, and a main controller configured to control the first motor controller and the second motor controller to transfer the power from the first battery pack to the second battery pack through the first set of windings and the second set of windings.

6. The system of claim 1, wherein the propeller can provide thrust as power is transferred from the first battery pack to the second battery pack through the first set of windings and second set of windings.

7. The system of claim 1, wherein the first electric propulsion unit is a tiltable proprotor.

8. The system of claim 1, wherein the first electric propulsion unit is a fixed rotor.

9. The system of claim 1, wherein the first and second battery packs are configured to be at least 100 volts.

10. The system of claim 1, wherein electric power of the first electric propulsion unit is at least 10 kilowatts.

11. The system of claim 1, wherein the first electric propulsion unit comprises a third set of windings electrically connected to a third battery pack, wherein the control system is further configured to control the third battery pack to transfer power from the first battery pack to the third battery pack through the first set of windings and the third set of windings.

12. The system of claim 1 comprising a second electric propulsion unit comprising a single set of windings electrically connected to the first battery pack.

13. A method for powering an electric aircraft comprising:
   detecting a first charge status of a first battery pack connected to a first set of windings of at least two sets of windings of a first motor and a second charge status of a second battery pack connected to a second set of windings of the at least two sets of windings of the first motor;
   determining whether there is a charge differential between the first battery pack and the second battery pack based on the first charge status and the second charge status; and in accordance with a determination that there is a charge differential, controlling the first battery pack, the second battery pack, and the motor to transfer energy from the first battery pack to the second battery pack through the first and second sets of windings to charge the second battery pack.

14. The method of claim 13, wherein the first charge status comprises at least one of a battery charge of the first battery pack and a discharge rate for the first battery pack, and the second charge status comprises at least one of a battery charge of the second battery pack and a discharge rate for the second battery pack.

15. The method of claim 13, wherein a first electric propulsion unit comprises the first motor and the first motor drives a propeller for achieving a desired thrust from the first electric propulsion unit.

16. The method of claim 15 comprising determining a power output required from the first set of windings to achieve the desired thrust from the first electric propulsion unit, determining an available power margin based on the power output, and transferring energy from the first battery pack to the second battery pack based on the available power margin.

17. The method of claim 16, wherein controlling the first battery pack, the second battery pack, and motor to transfer energy comprises generating, via the first set of windings, a torque on a rotor of the motor in excess of an amount of torque required to achieve the desired thrust and generating, via the second set of windings, electricity from excess torque for charging the second battery pack.

18. The method of claim 17, wherein the second battery pack powers a set of windings of a second motor.

19. An electric aircraft comprising:
a first electric propulsion unit comprising at least two sets of windings;
a first battery pack electrically connected to a first set of windings of the at least two sets of windings;
a second battery pack electrically connected to a second set of windings of the at least two sets of windings; and
a control system configured to control the first battery pack, the second battery pack, and the motor to transfer power from the first battery pack to the second battery pack through the first set of windings and the second of windings.

* * * * *